No. 767,807. PATENTED AUG. 16, 1904.
W. B. FENN.
GLASS PRESSING AND BLOWING MACHINE.
APPLICATION FILED JAN. 20, 1903.
NO MODEL. 4 SHEETS—SHEET 1.
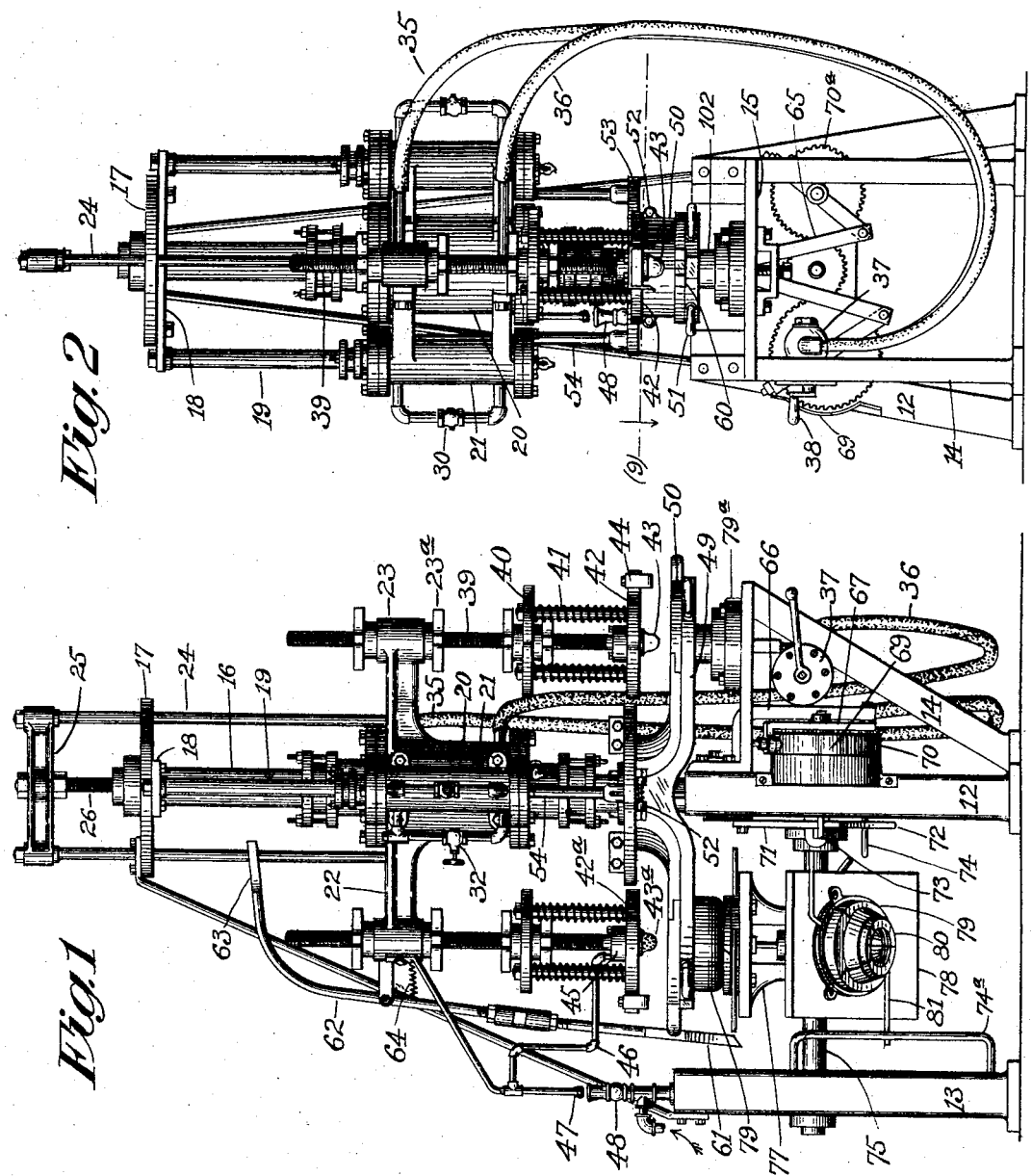

No. 767,807.
PATENTED AUG. 16, 1904.
W. B. FENN.
GLASS PRESSING AND BLOWING MACHINE.
APPLICATION FILED JAN. 20, 1903.
NO MODEL.
4 SHEETS—SHEET 2.
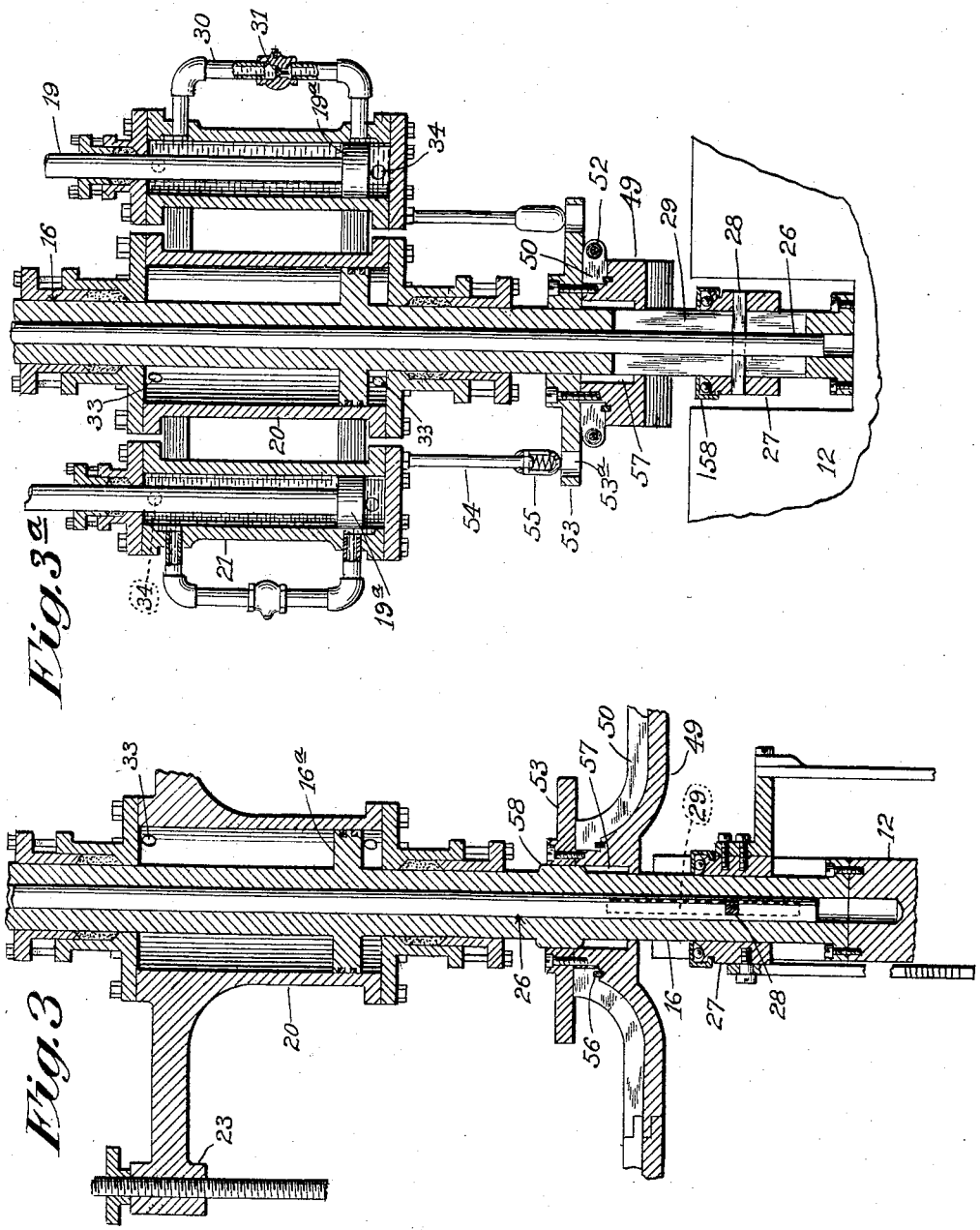
Witness:
F. W. H. Clay
Chas. H. Ebert
Inventor:
William B. Fenn
By
Paul Synnestvedt
Attorney.

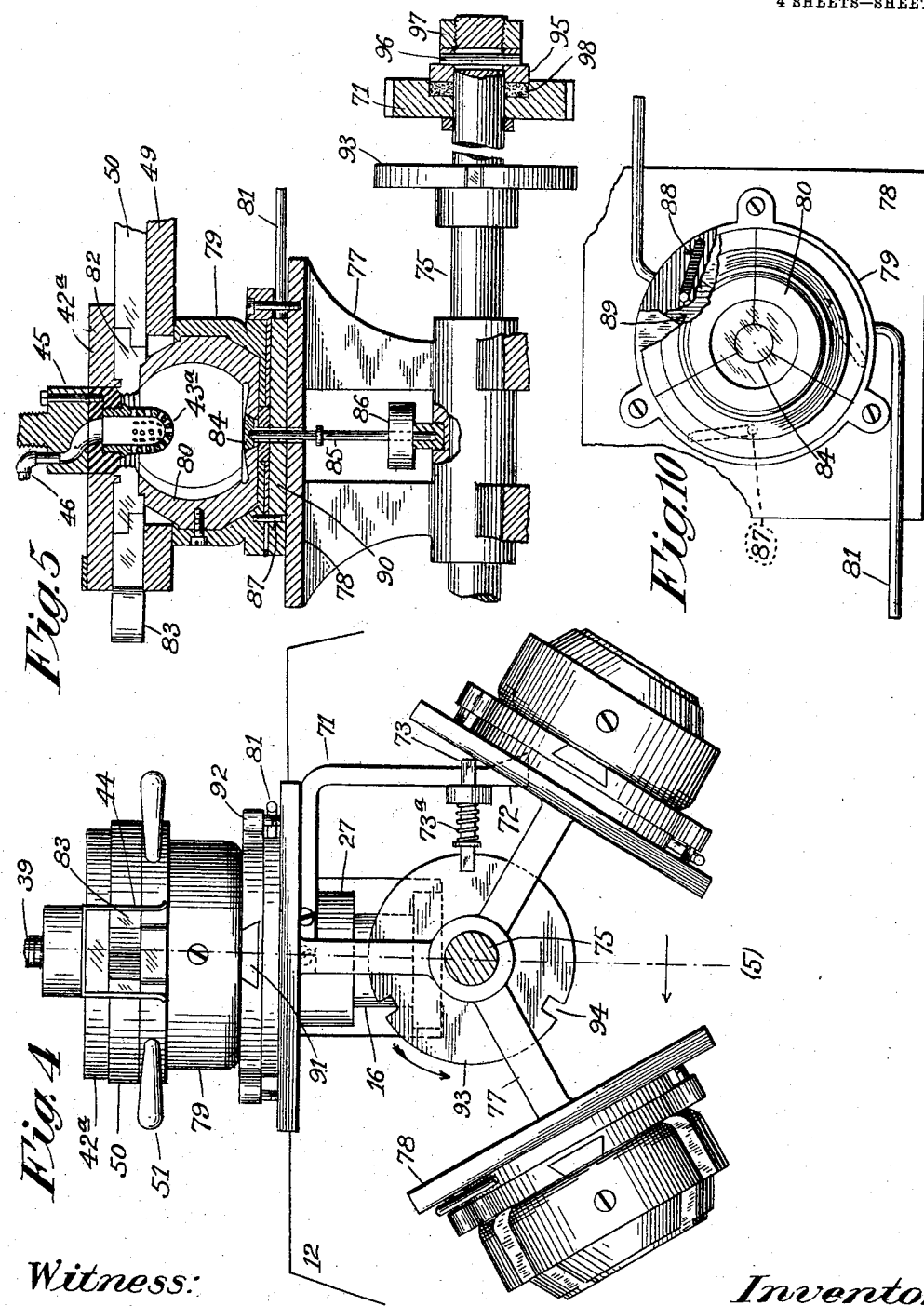

No. 767,807. PATENTED AUG. 16, 1904.
W. B. FENN.
GLASS PRESSING AND BLOWING MACHINE.
APPLICATION FILED JAN. 20, 1903.
NO MODEL.
4 SHEETS—SHEET 4.

Witness:
F. W. H. Clay
C. H. Ebert

Inventor;
William B. Fenn
By Paul Synnestvedt
Attorney.

No. 767,807. Patented August 16, 1904.

UNITED STATES PATENT OFFICE.

WILLIAM B. FENN, OF WASHINGTON, PENNSYLVANIA.

GLASS PRESSING AND BLOWING MACHINE.

SPECIFICATION forming part of Letters Patent No. 767,807, dated August 16, 1904.

Application filed January 20, 1903. Serial No. 139,852. (No model.)

*To all whom it may concern:*

Be it known that I, WILLIAM B. FENN, a citizen of the United States, residing at Washington, in the county of Washington and State of Pennsylvania, have invented certain new and useful Improvements in Glass Pressing and Blowing Machines, of which the following is a specification.

My invention relates to the glass-working art and particularly to apparatus for handling the material and the article during the process of pressing and blowing glass vessels. The principal objects of my invention are, first, to provide a machine which is automatic or semi-automatic in action to remove the glass from the press dies to the blowing dies or molds and automatically introduce the blast of air necessary for the blowing process as the glass is placed therein; second, to make a machine which carries on the two processes of pressing and blowing a quantity of glass at one and the same time; third, to make a machine which automatically removes the blown article from the mold when finished; fourth, to produce a machine which is easily and economically operated by means of compressed air or other fluid, to operate the pressing and blowing molds; fifth, to provide a machine which itself insures a proper pressure upon the glass and the proper introduction of a regular air pressure in the blow mold; sixth, to make a machine of automatically regulated speed and means for preventing too heavy pressure on the glass through carelessness of the workmen; seventh, to provide for the automatic introduction and cut-off of the air blast during the blowing process and the correct timing of the introduction of the blast; eighth, to provide a machine which requires no manual handling of the material after it is placed in the first mold; ninth, to provide for the automatic and continuous placing and removing of a succession of blow-molds in place to receive the glass, and the automatic release of the vessel when finished; tenth, to provide means for insuring a gradual application of pressure and the ready and rapid return of the presser head afterward. The invention also consists in the construction and arrangement of various parts of the machine, as will hereinafter appear, and in the general design of the machine and several improved details thereof which will be hereafter described.

The above objects, together with other advantages which will hereinafter appear, I attain by means of the mechanism and organization shown in the accompanying drawings, as a preferred form of construction.

In said drawings; Figure 1 is a front elevation of the whole machine.

Figure 2 is a side elevation of the whole machine, looking toward the left in Figure 1, the revolving mold heads being omitted.

Figure 3 is a partial central vertical section through the actuating cylinder and the head of the transfer arms, parallel with the plane of Figure 1.

Figure 3ª is a partial vertical central section through the cylinders and the head of the transfer or carrier arms, taken at right angles to the section of Figure 3.

Figure 4 is a left-hand side view in elevation of the revolving blow mold turret, looking toward the right in Figure 1 and showing the end of the transfer-arm in place on one of the blow molds.

Figure 5 is a central vertical section through the carrier head, blow mold and turret plate, taken on line 5 in Figure 4, and showing also at the right, a section of the gear 71 and its mounting on the other end of the shaft of the turret.

Figure 6:
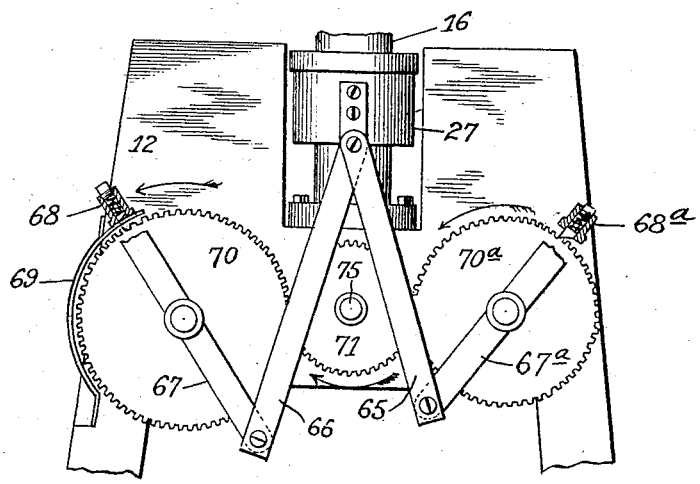

Figure 6 is an enlarged view in side elevation of the gears and mechanism for actuating the turret.

Figure 7:
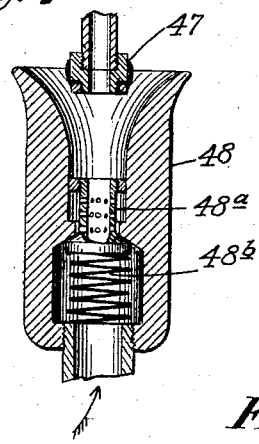

Figure 7 is an enlarged vertical section of the inlet valve for the air blast of the blow mold, marked 48 in Figure 1.

Figure 8:
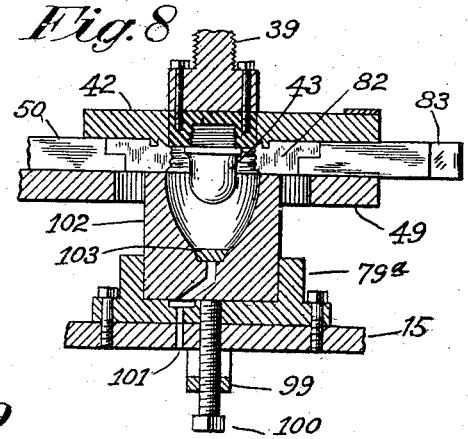

Figure 8 is an enlarged central vertical section, taken radially to the central piston, of the press mold and the press head, being similar to the section of Figure 5.

Figure 9:
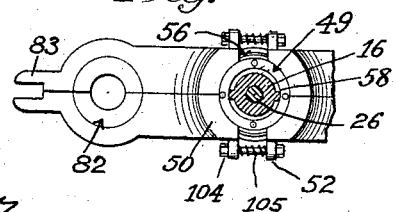

Figure 9 is a reduced plan view of one of the carrier arms, and a horizontal section through the central piston, taken on line 9 of Figure 2.

Figure 10 is a plan view, and partial section of the blow mold head mounted on its turret plate.

At the present time it is customary in making glass articles which require to be blown into a mold, to first place the charge of molten glass into a press mold, bring down a plunger which forms a cavity in the center of the material, then manually remove the glass to another mold, where provision is made for inserting an apertured nozzle in the cavity, and introducing a blast of air therein to expand the material against the sides of the blow mold; the amount of air admitted being governed by the skill of the workman. After this a separate blast of air is directed into the vessel to cool it and the mold, and the mold is opened and the vessel removed by hand tools. My machine is designed to obviate the removal of the glass from press mold to blow mold and discharging from the latter by hand and to perform all these operations automatically, except the swinging of the arm on its pivot.

In general, the whole machine is supported by and operates upon a fixed central piston rod, upon which the press head and blow head are raised and lowered, preferably by air pressure, and a swinging carrier arm mounted thereon removes the material from the press mold and transports it to the blow mold. Referring first to Figures 1 and 2, the machine may be mounted upon two upright frames 12, 13, and the struts 14, support the table 15, upon which is supported the press mold. Secured fixedly to the frame 12, there rises vertically a hollow piston rod 16, which is provided at its top with a head 17, and by means of the cross-bar 18, supports the piston rods 19. All three piston rods are provided with pistons, as shown in Figures 3 and 3ª, and are fixed in position. Riding upon this hollow piston rod 16, is an actuating cylinder 20, which has secured to it the governing cylinders 21, and is provided with arms 22, carrying heads 23, in which operate screw rods 39, adjustable therein by means of the lock nuts 23ª, and carrying the press head and blow head, respectively.

The rising and falling of the cylinder 20 upon its supporting piston rod 16 is caused by the introduction and exhaust, respectively above and below the plunger 16ª, through the ports 33, of compressed air through the pipes 35 and 36. The compressed air is supplied by any convenient inlet to a four-way cock 37, which is controlled by the workman by turning the handle 38. The piston and rod being stationary, the cylinder 20 raises and lowers the press and blow heads together. In bringing down the heads it is highly desirable that the motion should be slow, steady and certain. For this purpose I provide the auxiliary governing cylinders 21, which operate upon the piston rods 19, (Figure 3ª.) As the cylinders move up on the pistons 19ª there is free escape of the oil or other liquid with which these cylinders are filled, through the pipes 30 and the check valves 31, so that there is little resistance offered to the motion; but on the downward motion of said cylinders 21 the check valves 31 prevent the flow of liquid therethrough, and the escape is had through a restricted orifice in the throttle valve 32, shown in Figure 1. By this means the escape orifice can be made of a size to allow the press head to descend at whatever speed is desired, and it renders this speed certain and uniform without regard to the workman's handling of the machine.

Fixed upon the arms 22 of the actuating cylinder are two rods 24 carrying a cross head 25, which carries the central rod 26, running throughout the length of the hollow main piston rod 16, and at the bottom is provided with a pin 28, which works through a slot 29, in the piston rod 16, and actuates a collar 27, riding upon the outside of the piston rod 16, as clearly shown in Figures 3 and 3ª. Upon the central piston rod 16, between the actuating cylinder and this collar 27, there is provided a double carrier arm composed of the solid arm 49, and a split arm 50, (shown clearly in Figure 9.) As will be seen by Figures 3 and 3ª, the lower bar 49 surrounding the piston rod 16, is provided with an internal chamber 57, of a size to permit the turning of the arm upon the fixed keys 58, when the latter are below the cap plate 53, which is fixed to the hub of bar 49, as shown. But the plate 53 is slotted only, and the slots are so placed that the carrier arms cannot turn when they are down in the position shown in Figure 1. But when, by the continued upward movement of the cylinder 20 and the interior rod 26, the sleeve 27 is raised far enough to bring the bearing 158 against the bottom of the plate 49, and the carrier arm is raised until the keys 58 are entirely within the chamber 57, the carrier arms may freely revolve about the central piston of the piston rod and swing under the press head and blow head alternately.

The top bar 50 of the transfer arm is composed of four parts, as shown in Figure 9, and the split halves at the end are held together by means of the pressure of springs 105, on the rods 104, which pass through the lugs 52. The four parts of the bar 50 are held in place on the bar 49 by means of the ring 56, which is set into an annular groove, both in bar 49 and the parts of the bar 50, as more clearly shown in Figures 3 and 3ª. The two halves of the bar 50, at one end of the transfer arm, are provided with two halves of a screw ring 82, (see Figures 5 and 8,) which is provided with screw threads in order to hold the glass after it is pressed therein, by means of the press mold. The press mold 102 is of any ordinary form, and is placed upon the table 15, in a block 79ª, and is conveniently made adjustable in height therein by means of the screw 100, in the yoke 99, under the table 15. As usual, this mold is provided at the bottom with an air inlet 101, and a valve 103, and the plunger 43 is of the usual construction. It is attached to the press head 42, which is adjustably carried mediately by head 40 upon the screw 39, and the pressure is regulated by means of the adjustable springs 41. It will be understood that when the pressure is brought upon the press head 42, provision is made for a tight fit of the head 42 upon the top of the screw ring 82, in the split head 50, and the screw ring fits closely upon the mold 102, the lower bar 49 of the carrier arm having an opening therein, as shown in Figure 8. When the cylinder 20 is raised, its motion at first lifts the plunger 43 out of the press mold, and afterward lifts the transfer arm off the press mold, and up in position to turn freely on the central piston rod to carry the glass to the blow mold on the opposite side.

Referring particularly to Figures 4, 5, and 10, it will be seen that the blow molds are three in number in the present instance, and are carried upon the tables 78 of a revolving turret, being supported from the radial arms 77 of a hub mounted upon the horizontal shaft 75, which is supported at its two ends in the frames 12, 13. The plate 92 is fixed to the table 78 and has three radial dove-tailed slots 89, in which reciprocate tongues 91 of a three-part mold head 79. The mold head carries the three parts of a mold 80, and the parts of the mold head 79 are opened and closed by the radial motion of the same, which is produced by means of the downwardly projecting pins 87, which work in inclined or spiral slots 88, formed in the rotatable plate 90, which is provided with handles 81, for this purpose. The screw ring 82, carried in the split plate 50 of the carrier arm, fits neatly upon the top of the mold 80, and is pressed down by the blow head $42^a$, as shown in Figure 5. The blow head $42^a$ is provided with an apertured nozzle $43^a$, and to the shoulder 45 of the blow head, is attached a pipe 46, which is rigidly carried in place on the moving part of the machine, and is provided with a plunger 47, which fits into a valve 48, and automatically admits the compressed air into the blow mold 80 when the head $42^a$ is pressed into place. This valve is shown in detail in Figure 7, where it is shown as a perforated shank puppet valve $48^a$, kept in place by a spring $48^b$. But its particular construction is, of course, not essential to the invention. The blow mold is provided with a loosening disk 84 in the bottom, which may be conveniently carried upon a reciprocating rod 85, as shown in Figure 5. The weight 86 rides loosely upon the rod 85, so that as the mold carrying the finished article is turned downward by the revolution of the turret, it may strike a bead upon the rod 85, and loosen the article from the mold so that it may drop out. It will be understood from the drawings that the opening of the mold 80 is accomplished by the turning of one handle 81 striking a fixed dog 74, as it turns in the direction back of the plane of the picture in Figure 1. After dumping the article, it is closed again by the striking of the other handle 81 on the closing dog $74^a$, shown in the foreground in Figure 1, and which is of a proper shape to easily and securely close the sections of the mold.

The turning of the turret, for revolving the series of blow molds about the shaft 75, is accomplished by the reciprocating motion of the collar 27 upon the central piston rod 16, and through the agency of the arms 65, 66, fixed thereon. From Figure 6 it will be seen that as the collar 27 falls, the arm 65 will turn the pivoted arm $67^a$, which is carried upon the axle of the gear wheel $70^a$, and by means of the rachet $68^a$ turns the said gear in a counter-clock-wise direction, and turns the gear 71 on the shaft 75 so as to revolve the turret and blow molds in a clock-wise direction in Figure 4. During the time when the gear 71 is being actuated by the gear $70^a$, the other ratchet 68, on the pivoted arm 67, is lifted off the wheel 70 by means of the guard 69, and allows the wheel 70 through part of its motion to turn freely. Upon the reversed motion of the collar 27 the actuation of pivoted arm 67 through the link 66 will cause the ratchet 68 thereon to revolve wheel 70 and continue the motion of the turret in the same direction. In order to allow for the turret and blow mold to remain stationary during the initial rising motion of the blow head and the lifting of the carrier arm out of engagement with the mold 80, the gear wheel 71 upon the shaft 75, (as shown in Figure 5,) is attached by a friction clutch, such as the leather washer 98, which is pressed inward by the plate 95, clamping the leather 98 against the wheel, the plate being turned by means of the pin 96, working in a slot in the shaft 75. The pressure upon the leather packing 98 is regulated by means of the nut 97. In order to further insure the correct placing and secure holding of the several turret plates and blow molds in proper position, I provide upon the shaft 75 a fixed disk 93, which has three notches 94, which are engaged by a reciprocating dog 73, mounted in a bracket on the frame 12 and pressed inward by spring $73^a$. The head of the dog 73 is provided with means to engage a wedge 72, which is drawn upward by an arm 71, fixed to the reciprocating collar 27, on the central piston rod 16, whereby when the carrier arm and screw ring are lifted off the blow mold, the dog 73 is withdrawn from the notch 94 in order to allow the revolving of the turret.

In order to release the split screw ring 82 from the article after the completion of the blowing, I provide upon an extension of the arm 22, a pivoted rod 62, which has a split head 63, guided upon the reciprocating rod 24, and is in a position to strike the plate 17 in order to trip at the right time. It is normally pressed inward by the tension spring 64 and at its lower end has a wedge 61, which drops into the open slot between the ends 83 of the split carrier arm which bears the screw ring. (See Figure 9.) The drawing upward of the wedge 61, therefore, will spread the halves of the screw ring and release the finished vessel; and a little further rise of the head 63 will cause it to strike the plate 17 and remove the wedge 61 from the carrier arm in order that the latter may be swung around again to change ends, and repeat the operation.

In order to make certain that the press and blow heads may not be brought down in any but the right position, I attach to the moving frame of the cylinders vertical safety studs 54, which register with holes 53ª in the plate 53, when the carrier arms are in proper position. The studs 54 are preferably provided with rounded spring heads 55, in order that the studs 54 may not accidentally jam suddenly against the plate 53. It will be seen that the position of the slots in the plate 53 registering with the keys 58, will also insure the carrier arms against descending upon the mold until they are in proper register therewith. As an additional security I provide the guiding flanges 44 on the reciprocating heads, to fit over the ends of the carrier arms.

It will be understood that some provision is made for filling the auxiliary cylinders 21 with oil, such as the inlet shown at the top of the pipe carrying the throttle valve 32, in Figure 1. It will be evident also that the inlet valve for the air pressure, 47, 48, may be placed in any convenient position so long as the plunger 47 is carried somewhere on the movable part of the machine. I have provided convenient handles 51 upon the solid plate of the carrier arm for turning the same. I provide some means, not shown in the drawings, for receiving the completed vessel as it drops out of the mold 80 when the turret turns the same down, such as a bed of asbestos wool on a traveling carrier. The vessel is generally sufficiently cool for removal by the time the mold is inverted and opened.

From the above description it will be plain that in operation, while the one workman necessary to attend the machine is swinging the carrier arms end for end, and the presser head 42 is raised, the furnace attendant will drop into the press mold a sufficient quantity of glass. The attendant of the machine then, by reversing the four-way cock, allows the cylinder and the carrier arm and presser and blow heads to drop into place when all parts of the press mold fit securely together and the plunger thereof forms a cavity inside of the mass of glass, at the same time that the perforated plunger of the blow mold enters into this cavity in the previously formed vessel and automatically introduces the air blast and spreads the glass against the finishing blow mold. The handle of the governing cock may be turned on fully, as the descent of the presser head is governed and regulated by the auxiliary cylinders and the escapement of the liquid therein, while the safety studs 54 prevent the descent of the presser head into any but the proper position. The four-way cock then being reversed, the cylinder and the heads first are rapidly raised out of place, shutting off the air blast. The continued rising of the cylinder next raises the carrier arms off the molds and into position to be revolved. Immediately thereafter the turret carrying the finished article in the sectional mold, turns downward and at its lowermost position is opened by the tripping dog and by the falling of the displacement weight, striking the bottom of the vessel, the finished article is ejected; thereupon continuing its revolution the mold is again closed as it comes upward into position for a new blowing operation. The turret is stationary while the blowing is going on, and this gives ample time for the cooling of the vessel before it is discharged. The entire action except the placing of the material at first, and the swinging of the carrier arms, is automatic, and by the simultaneous operation of both the molds the output of one workman is at least doubled over the common method. In the meantime the machine itself is provided throughout with safety appliances to prevent the spoiling of any of the vessels, even by careless handling of the workman. A great saving of compressed air is also attained by the automatic inlet valve for the blast. All parts of the machine are adjustable in height, and the amount of pressure on the head is regulated by the compression of the springs thereto attached. The operation of the device for opening the jaws carrying the two halves of the screw ring, by means of the swinging wedge 61, has been heretofore described. All the working parts of the mold and the pistons and screw ring, &c. are interchangeable, as will be understood. The various advantages of the machine will be evident to those familiar with the art.

It will be understood, of course, that it is entirely within the scope of this invention, if the machine be so arranged as to attach the arms carrying the reciprocating head, to the piston rod, place the piston itself below the carrier arms and stationary, while the piston reciprocates. It is also evident that other means of opening and closing the molds are within the scope of the invention, such for example, as a blow mold arranged upon the turret plates in such a way as to fall apart by the action of gravity, in order to discharge the vessel, and again close by gravity as the mold is righted up again into position.

Having thus described my invention and its use, what I claim, and desire to secure by Letters Patent, is the following:

1. A glass handling machine comprising a reciprocating actuating member with arms rigid thereon carrying at the ends respectively a press-head and plunger, and a blow-head and plunger, appropriate molds for pressing and blowing, an arm with carrier rings at its ends, and mechanism for lifting the glass out of the press mold and carrying it to the blow mold, interchanging the positions of the carrier rings, whereby the two operations of pressing and blowing are carried on at the same time.

2. A glass pressing and blowing machine comprising a press-mold and a blow-mold, a press-head and blow-head, and press-plunger and blow-plunger, each head and its plunger being carried on the same movable part, means for simultaneously reciprocating the two heads and plunger, and a swinging transfer arm co-operating alternately with the respective molds and heads, substantially as described.

3. In a glass pressing and blowing machine the combination with a press head and blow head and means for reciprocating the same together in a fixed vertical plane of a press mold, a series of blow molds with means for bringing them in place under the blow head, and a swinging carrier arm for transporting the glass from the press mold to the blow molds.

4. In a glass pressing and blowing machine, in combination with a press mold and a blow mold, a fixed central piston rod provided with a piston, a movable cylinder thereon carrying a press head and plunger, and a blow head and plunger, for co-operation with said molds.

5. A glass pressing and blowing machine having a single vertically reciprocating member carrying on its two ends respectively a press-head and plunger, and a blow-head and plunger, the stem of the plunger in each instance carrying thereon the press-head for the plunger, substantially as described.

6. In a glass pressing and blowing machine, the combination with a stationary press mold and a temporarily stationary blow mold, of a simultaneously reciprocating press-head and blow-head co-operating therewith, and a pivoted carrier arm having means for attaching a charge of glass during the pressing operation and means for detaching after the blowing operation, the said arm being adapted to transfer the glass from the press mold to the blow mold when the said heads rise, substantially as described.

7. A glass handling machine having a fixed central piston rod and piston, a cylinder mounted thereon operated by compressed air, and having two arms carrying respectively a press head and plunger and a blow head and plunger, and a swinging carrier arm co-operating with said heads.

8. In a glass pressing and blowing machine, a vertically reciprocating member having two outwardly extending arms, a press plunger on one of said arms carrying a press-head thereon, and a blow plunger on the other of said arms carrying a blow-head thereon, and means for transferring the glass from the press mold to the blow mold, substantially as described.

9. In a glass pressing and blowing machine, a vertically revolving turret carrying a plurality of sectional molds, with automatic means for bringing the molds under the blowing head and for opening and closing said molds.

10. A glass pressing and blowing machine comprising a movable central actuating air cylinder for operating a press head and blow head, an auxiliary cylinder fixed to the central cylinder, provided with a piston and filled with oil, and having an adjustable escapement for said oil, whereby the motion of the central actuating cylinder is governed and regulated, substantially as described.

11. In a glass handling machine, a stationary piston and movable cylinder having press-head arms, and a regulator for the cylinder consisting of a cylinder filled with oil, a piston therein, a pipe and a check valve therein allowing movement of the oil in one direction only, and a second pipe having a throttle valve allowing escape of oil in the other direction.

12. In a glass pressing and blowing machine the combination with a fixed piston rod, of a movable cylinder thereon carrying a press head and a blow head, and automatic means for causing rapid motion of the cylinder in one direction and slow and regular motion in the other direction, in reciprocating said head.

13. The combination with a blow head and means to reciprocate the same, of a mold turret revolving in a vertical plane and co-operating with the head to bring blow molds thereunder, and a ratchet device on the turret axle adapted to turn the same and being driven by means of the reciprocating head, substantially as described.

14. In a glass pressing machine in combination with reciprocating press and blow heads and a two-armed transfer device, a compressed air cylinder for reciprocating said head and devices operated thereby for placing and removing a support for blow mold under the said blow head.

15. In a glass blowing machine, the combination with a blow mold and a valve, of a combined blow head and plunger having an air inlet and a separate rigid arm carried by the head for operating the valve and means for automatically admitting compressed air into the mold when the head is brought down upon the same simultaneously with the plunger, substantially as described.

16. The combination with a blow mold and a blow head, of means for reciprocaitng the head to press it upon the mold, an air inlet to the blow head, means to supply air and a puppet valve, a plunger attached to the reciprocating head and adapted to open the valve and admit air to the mold when the head is brought down on the mold.

17. A sectional mold and mold support comprising radially movable parts provided with projections, a revolving plate having slots to co-operate with said projections to open and close the mold, and means for turning said plate, substantially as described.

18. In a glass pressing and blowing machine a reciprocating arm and rod, a presser head carried thereon and adjustable in height and attached to said rod indirectly by adjustable compression springs.

19. In a glass pressing and blowing machine, in combination with reciprocating heads, a shaft having a revolving mold turret, said turret being driven by ratchet devices, and a pinion on the turret shaft engaging therewith through a friction clamp.

20. In a glass handling machine, in combination with a reciprocating head and a pivoted carrier arm, a safety stud connected with said reciprocating head and adapted to prevent the descent of the same in any other than the correct position, by registering with a hole in the said pivoted arm.

21. In a glass handling machine in combination with a head, and means for reciprocating the head and a bifurcated carrier arm, a pivotally mounted wedge adapted to open the jaws of said bifurcated arm, and operated by the means which reciprocate the head.

22. A blow mold mounted upon a revolving turret, and provided with movable disk valve in its bottom, in combination with a shifting weight and a supporting rod therefor attached to said valve, and means by which when the mold is turned in inverted position, said shifting weight acts upon said rod to loosen the vessel in said mold.

23. The combination of a fixed piston rod having keys thereon, a movable rod within said piston rod and means for reciprocating it, a carrier arm mounted on and reciprocated by said piston rod, and provided with a hub with an enlarged chamber therein for said keys, said chamber being covered by a plate having slots for the admission of the keys to the chamber when said arm is lifted by said movable rod reciprocating in the piston rod.

24. The combination of a revolving mold turret, a vertically reciprocating rod and means for reciprocating it, a pair of arms operated by said rod, a pair of gears operated by said arms, and carrying ratchets whereby the said gears are operated, and a gear wheel co-operating with the said gears and mounted upon the shaft of the turret and in adjustable friction engagement therewith.

In testimony whereof I have hereunto set my hand in the presence of the subscribed witnesses.

WILLIAM B. FENN.

Witnesses:
MINNIE A. LEONARD,
JAMES P. EAGLESON.